(12) United States Patent
Meyer et al.

(10) Patent No.: US 7,734,712 B1
(45) Date of Patent: *Jun. 8, 2010

(54) METHOD AND SYSTEM FOR IDENTIFYING STORAGE DEVICES

(75) Inventors: Richard Meyer, San Francisco, CA (US); Glen C. Yu, San Jose, CA (US); Rahim Ibrahim, Mountain View, CA (US); Gen-Hwa Chiang, Milpitas, CA (US); Kwan Sang Yap, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 582 days.

This patent is subject to a terminal disclaimer.

(21) Appl. No.: 11/700,593

(22) Filed: Jan. 30, 2007

Related U.S. Application Data

(63) Continuation of application No. 10/076,909, filed on Feb. 13, 2002, now Pat. No. 7,203,730.

(60) Provisional application No. 60/268,694, filed on Feb. 13, 2001.

(51) Int. Cl.
G06F 15/167 (2006.01)
G06F 15/173 (2006.01)

(52) U.S. Cl. .................. 709/213; 709/250; 709/218; 709/227; 370/400

(58) Field of Classification Search .............. 709/213, 709/223, 224
See application file for complete search history.

(56) References Cited

U.S. PATENT DOCUMENTS

| | | | |
|---|---|---|---|
| 4,916,608 A | 4/1990 | Shultz | |
| 5,325,505 A | 6/1994 | Hoffecker et al. | |
| 5,455,834 A | 10/1995 | Chang et al. | |
| 5,668,968 A | 9/1997 | Wu | |
| 5,704,032 A | 12/1997 | Badovinatz et al. | |
| 5,787,494 A | 7/1998 | DeLano et al. | |
| 5,897,661 A | 4/1999 | Baranovsky et al. | |
| 5,920,700 A | 7/1999 | Gordon et al. | |
| 5,996,086 A | 11/1999 | Delaney et al. | |
| 6,067,608 A | 5/2000 | Perry | |
| 6,104,871 A | 8/2000 | Badovinatz et al. | |
| 6,145,028 A | 11/2000 | Shank et al. | |
| 6,161,111 A * | 12/2000 | Mutalik et al. .............. 707/205 |

(Continued)

FOREIGN PATENT DOCUMENTS

EP    0380854 A2    9/1989

(Continued)

OTHER PUBLICATIONS

Robert M. Montague et al., Virtualizing the San, Morgan Keegan & Company, Inc. Members New York Stock Exchange, Inc., Equity Research, Jul. 5, 2000, pp. 1-20.

(Continued)

*Primary Examiner*—Jude J Jean Gilles
(74) *Attorney, Agent, or Firm*—Wiesner and Associates; Leland Wiesner

(57) ABSTRACT

Embodiments according to the invention perform functions including discovery, classification, and profiling of storage devices, computer systems, connection elements, and other components relating to a storage area network (SAN). Changes to the SAN topology are tracked in order to show growth patterns.

27 Claims, 14 Drawing Sheets

U.S. PATENT DOCUMENTS

| | | |
|---|---|---|
| 6,185,695 B1 | 2/2001 | Murphy et al. |
| 6,202,157 B1 | 3/2001 | Brownlie et al. |
| 6,208,543 B1 | 3/2001 | Tupuri et al. |
| 6,247,077 B1 | 6/2001 | Muller et al. |
| 6,289,376 B1 | 9/2001 | Taylor et al. |
| 6,295,575 B1 | 9/2001 | Blumenau et al. |
| 6,421,711 B1 | 7/2002 | Blumenau et al. |
| 6,442,666 B1 | 8/2002 | Stracovsky |
| 6,453,404 B1 | 9/2002 | Bereznyi et al. |
| 6,571,354 B1 | 5/2003 | Parks et al. |
| 6,598,174 B1 | 7/2003 | Parks et al. |
| 6,609,213 B1 | 8/2003 | Nguyen et al. |
| 6,625,747 B1 | 9/2003 | Tawil et al. |
| 6,629,264 B1 | 9/2003 | Sicola et al. |
| 6,636,239 B1 | 10/2003 | Arquie et al. |
| 6,640,278 B1 | 10/2003 | Nolan et al. |
| 6,658,590 B1 | 12/2003 | Sicola et al. |
| 6,691,244 B1 | 2/2004 | Kampe et al. |
| 6,769,071 B1 | 7/2004 | Cheng et al. |
| 6,772,365 B1 | 8/2004 | Obara |
| 6,775,230 B1 | 8/2004 | Watanabe et al. |
| 6,792,503 B2 | 9/2004 | Yagi et al. |
| 6,801,992 B2 | 10/2004 | Gajjar et al. |
| 6,834,326 B1 | 12/2004 | Wang et al. |
| 6,854,069 B2 | 2/2005 | Kampe et al. |
| 6,857,059 B2 | 2/2005 | Karpoff et al. |
| 6,895,528 B2 | 5/2005 | Cantwell et al. |
| 6,898,670 B2 | 5/2005 | Nahum |
| 6,907,457 B2 | 6/2005 | Merrell et al. |
| 6,920,494 B2 | 7/2005 | Heitman et al. |
| 6,971,016 B1 | 11/2005 | Barnett |
| 6,977,927 B1 | 12/2005 | Bates et al. |
| 7,039,827 B2 | 5/2006 | Meyer et al. |
| 7,056,616 B2 | 6/2006 | Gajjar et al. |
| 7,103,653 B2 | 9/2006 | Iwatani |
| 7,203,730 B1 * | 4/2007 | Meyer et al. ................ 709/213 |
| 2002/0026558 A1 | 2/2002 | Reuter et al. |
| 2002/0073257 A1 | 6/2002 | Beukema et al. |
| 2002/0083187 A1 | 6/2002 | Sim et al. |
| 2002/0188711 A1 * | 12/2002 | Meyer et al. ................ 709/223 |
| 2003/0037127 A1 | 2/2003 | Shah et al. |

FOREIGN PATENT DOCUMENTS

| | | |
|---|---|---|
| WO | WO 02/05185 A1 | 1/2002 |

OTHER PUBLICATIONS

Chris Mercier et al., Discovery in the San Definition and Terminology, Jun. 2000, Version 1.1, Published by: SNIA Discovery Working Group.

Mayez A. Al-Mouhamed et al., "A Heuristic Storage for Minimizing Access Time of Arbitrary Data Patterns," IEEE Transactions on Parallel and Distributed Systems, Apr. 1997, pp. 441-447, vol. 8, No. 4.

IBM, IBM Network Processor (IBM32NPR161EPXCAC133), Product Overview, Nov. 4, 1999, pp. 1-17.

M. Pease et al., "Reaching Agreement in the Presence of Faults," Journal of the Association for Computing Machinery, vol. 27, No. 2, Apr. 1980, (Abstract) 1 page.

Fred B. Schneider, "Implementing Fault Tolerant Services Using the State Machine Approach: A Tutorial," ACM Computing Surveys, vol. 22, No. 4, Dec. 1990, (Abstract) 1 page.

Leslie Lamport et al., "The Byzantine Generals Problem," ACM Transactions on Programming Languages and Systems, vol. 4, No. 3, Jul. 1982, (Abstract) 1 page.

* cited by examiner

US 7,734,712 B1

METHOD AND SYSTEM FOR IDENTIFYING STORAGE DEVICES

CROSS-REFERENCES TO RELATED APPLICATIONS

The present application is a continuation of U.S. patent application Ser. No. 10/076,909, filed on Feb. 13, 2002 now U.S. Pat. No. 7,203,730, which claims priority from U.S. Provisional application No. 60/268,694, filed on Feb. 13, 2001 and titled, "Virtual Storage Systems," which are incorporated herein by reference for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE. OR A COMPUTER PROGRAM LISTING APPENDIX SUBMITTED ON A COMPACT DISK

NOT APPLICABLE

BACKGROUND OF THE INVENTION

The present invention relates generally to computer storage and in particular to identifying information about those elements which constitute a storage area network.

Knowledge is an important competitive advantage for any business. The drive to develop knowledge stores and improve storage hardware capacity leads to explosive growth in storage and computing resources. As a consequence of businesses depending increasingly on applications and their underlying data, continuous, reliable, and rapid access to data becomes critical. It is important to be able to guarantee online access and quick restores of lost data. Mass storage systems are becoming increasingly complex as developments in storage technology continue to meet the demands of the market.

A natural evolutionary trend in the provision and management of mass storage systems has been the development of storage area networks (SANs). SAN is a storage architecture which provides high capacity storage capability that is accessed reliably and transparently by users. The architecture virtualizes physical disks into a large consolidated pool and then presents the individual users (web servers, enterprise servers, PC users, and so on) with virtual disks from the pool.

SAN architectures typically comprise a collection of various storage technologies, each having different capabilities optimized for specific situations; e.g., individual disks, arrays such as RAID (redundant array of inexpensive disks) and JBOD (just a bunch of disks), tape drives, and so on. Fibre channel switches are typically used to connect computer users (servers, PC users, etc.) to the storage devices.

Allocating storage for an application, such as a database running on a server, is a complex and error-prone process. Usually, it requires the system administrator to know the details of what storage device(s) would be the right match for the particular application. Obtaining knowledge about such details as throughput, access time, multi-path policy, reliability, and availability is a process which invariably relies on the individual expertise of one person or another.

In addition, business organizations sharing a single large SAN typically use a fibre channel switches' port zoning capability to zone off, or hide, one organizations devices from another organizations devices. Zoning is done a switch at a time. This becomes complex as switch after switch is added to the SAN.

BRIEF SUMMARY OF THE INVENTION

Embodiments in accordance with the invention provide an automated system and method for discovering functional capabilities of elements which comprise a SAN (storage area network). The information is obtained by categorizing each SAN device by attributes, functions and capabilities. The information is of interest for the purpose of storage configuration and management, and is used to intelligently match server storage requests to storage devices, thereby simplifying SAN storage management.

An aspect of the invention provides different divisions in a large enterprise to share the same SAN by assigning a user domain to each physical SAN element. Only users whose domain identifier matches the assigned domain identifier can access that SAN element.

Information provided in accordance with the invention addresses problems in another area of SAN management, namely inventory control and data center growth planning. Tools are provided for discovering and displaying the physical topology of a SAN to facilitate periodic monitoring to identify changes in a SAN. Processing in accordance with an illustrative embodiment of the invention involves periodically creating a baseline of physical topology as specified by a user policy, comparing that baseline to the previous baseline, and generating reports showing base inventory and various growth patterns, such as amount of new disk storage and so on.

DETAILED DESCRIPTION OF THE INVENTION

Figure 1:
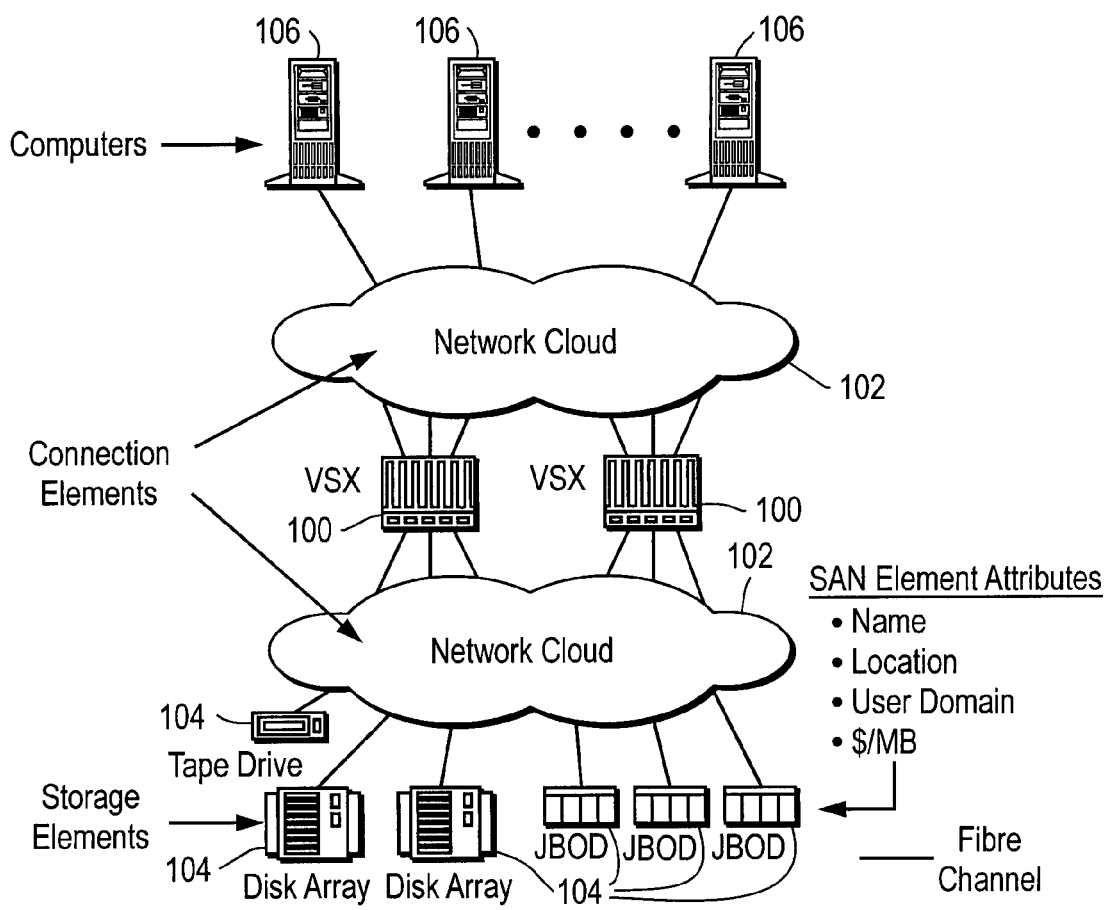
FIG. 1 is a high level generalized illustration of a storage area network including a storage server according to an embodiment of the present invention.

FIG. 1 shows a storage server 100 according to an embodiment of the present invention. The figure also shows a storage area network (SAN) 102, a number of physical storage devices 104, and a number of host computers 106. The storage server 100 is also referred to as a Virtual Storage Exchange (VSX) and is further detailed in FIGS. 2A-2B.

The SAN 102 can be any type of computer network. It is referred to as a storage area network in the present application because that is its relevant function with respect to the embodiments of the present invention. In an embodiment of the present invention, the SAN 102 is a Fibre Channel network, the host computers 106 and the storage devices 102 are configured to communicate with a Fibre Channel network, and the storage server 100 is also configured to communicate with a Fibre Channel network. Thus, the storage server 100 can be easily added to an existing SAN.

The physical storage devices 104 include tape drives, disk arrays, JBODs ("just a bunch of disks"), or other types of data storage devices. The physical storage devices 104 can be connected directly to the host computers 106 via the SAN 102 or can be indirectly connected to the host computers 106 via the SAN 102 and the storage server 100. It has been observed that management of storage virtualization is burdensome when the storage devices 104 are directly connected to the host computers 106 via the SAN 102. The present invention improves management of storage virtualization by using the storage server 100 to indirectly connect the storage devices 104 to the host computers 106.

The host computers 106 can be servers or stand-alone computers. The host computers 106 can be directly connected to the SAN 102 or indirectly connected via a switch, router, or other communication link.

Figure 2A:
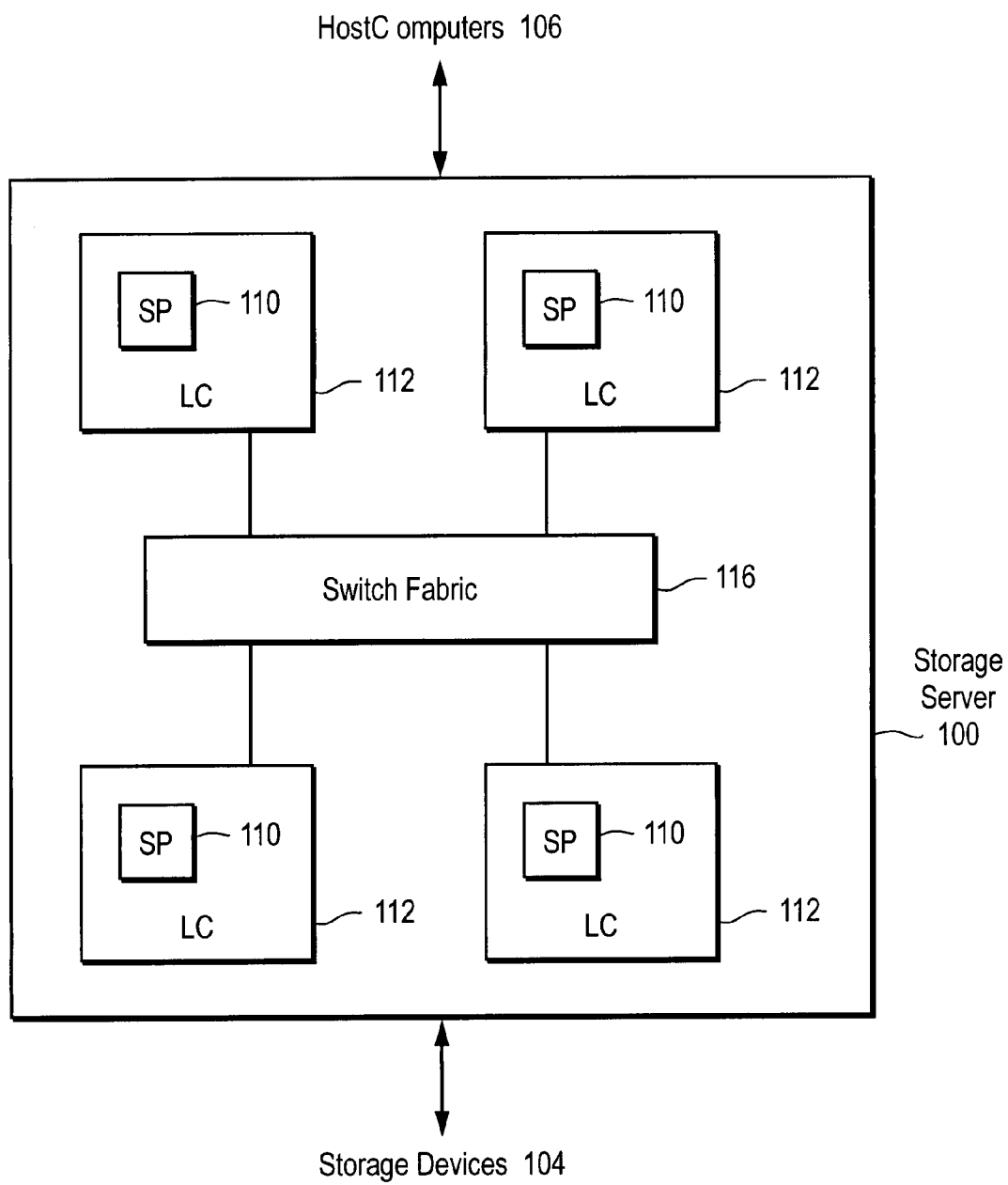
FIG. 2A shows a high level block diagram of hardware components in the storage server according to an embodiment of the present invention.

FIG. 2A is a block diagram of the storage server 100 showing the hardware components related to embodiments of the present invention, including a storage processor 110, a line card 112, a virtual server card 114, and a switch fabric 116.

The storage server 100 may include one or more storage processors 110 (SP). The storage processors 110 process the storage commands and data to be stored as information flows between the host computers 106 and the storage devices 104. One or more of the storage processors 110 may be included on each line card 112 (LC). The storage server 100 includes space for numerous line cards 112, so the capabilities of the storage server 100 can be modularly increased by adding more line cards 112 or more storage processors 110. Each storage processor 110 is associated with one or more ports of the storage server 100.

The storage server 100 may include one or more virtual server cards 114 (VSC). The virtual server cards control the operation of the storage server 100 and control the line cards 112, which perform the actual work of transferring commands and data.

The switch fabric 116 connects the storage processors 110. The switch fabric switches information received at one port to another port of the storage server 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 116. Then the switch fabric 116 transfers the data read from the storage device to the, host computer 106, via the downstream and upstream storage processors 110.

Figure 2B:
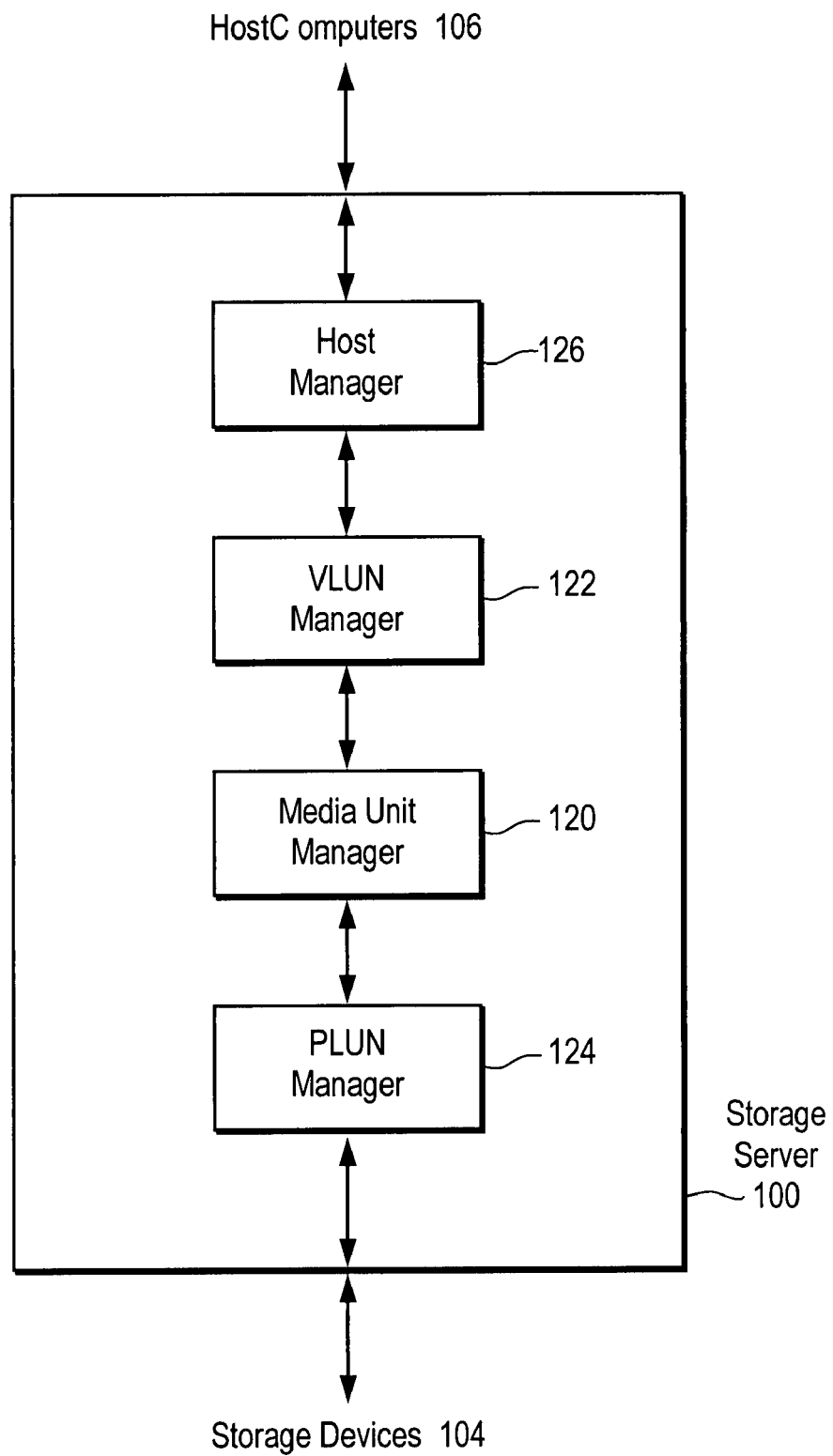
FIG. 2B illustrates a general block diagram of management functions in the storage server according to an embodiment of the present invention.

FIG. 2B is a block diagram of the storage server 100 showing the functionality relevant to embodiments of the present invention. The functions of the storage server 100 may be implemented by one or more processors that execute processing according to one or more computer programs, microcode segments, hardware structures, or combinations thereof. The functions relevant to the present invention are the media unit (MU) manager 120, the virtual logical unit number (virtual LUN or VLUN) manager 122, the physical logical unit number (physical LUN or PLUN) manager 124, and the Host Manager 126. The Host Manager provides two basic functions. First, it maintains customer information about the physical topology of Hosts in the SAN and maps HBAs found by the Discovery Manager to the Host, as required by the customer. Hosts can be grouped into clusters to help manage shared, or clustered, storage. Once the physical topology is described to the Host Service, the Host Service becomes the consumer of exported storage.

Additional details of the storage server 100 are disclosed in U.S. Provisional Application No. 60/268,694 and in the following co-pending, commonly owned U.S. patent applications: U.S. patent application Ser. No. 10/077,696, filed Feb. 13, 2002, titled Silicon Based Storage Virtualization Server; U.S. patent application Ser. No. 10/076,855, filed Feb. 13, 2002, titled Storage Virtualization and Storage Management to Provide Higher Level Storage Services; U.S. patent application Ser. No. 10/076,909, filed Feb. 13, 2002, titled Method and Apparatus for Identifying Storage; U.S. patent application Ser. No. 10/077,482, filed Feb. 13, 2002, titled System and Method for Policy Based Storage Provisioning and Management; U.S. patent application Ser. No. 10/077,181, filed Feb. 13, 2002, titled Virtual Data Center; U.S. patent application Ser. No. 10/076,906, filed Feb. 13, 2002, titled Failover Processing in a Storage System; U.S. patent application Ser. No. 10/077,199, filed Feb. 13, 2002, titled RAID at Wire Speed; U.S. patent application Ser. No. 10/076,878, filed Feb. 13, 2002, titled Method for Device Security in a Heterogeneous Storage Network Environment; all of which are incorporated herein by reference for all purposes.

The PLUN manager 124 manages data and command transfer to and from the storage devices 104. Each storage device 104 may have associated therewith a PLUN that is used for identifying each particular storage device 104. Typically, a physical device is associated with one PLUN. However, depending on the sophistication of the storage device, the physical device may have more than one PLUN associated with it. Each PLUN in such a situation represents a different physical storage space in the storage device.

The VLUN manager 122 manages data and command transfer to and from the host computers 106. Each host computer 106 may be associated with one or more VLUNs. Each VLUN represents a virtual address space (e.g., gigabytes of storage) with defined attributes (e.g., performance parameters, reliability level, etc.). As such, each host computer 106 exchanges data and commands with the storage server 100 with reference to a particular VLUN.

The MU manager 120 basically translates between VLUNs and PLUNs. The MU manager 120 is responsible for managing the address space of all the storage devices 104 (physical LUNs) connected to the storage server 100. The MU manager 120 also manages the address space of the storage constructs built within the storage server 100, including slices, concatenations, RAID0 (stripes) and RAID1 (mirrors).

The MU manager 120 uses an abstract block-storage addressing technique that enables address spaces to be treated in a logical manner, regardless of the underlying storage constructs or physical LUNs. These logical address spaces can be combined together into more complex and feature rich storage constructs, which are also treated simply as abstract block-storage address spaces.

Used in conjunction with a virtual LUN, these logical address spaces can be configured to appear as LUNs on a multi-ported storage device. This process of presenting physical LUNs as logical address spaces on virtual devices is referred to as storage virtualization.

A function of the VSX is to centralize the management layer in the SAN. It organizes the connections, storage elements, and computer systems into abstract relationships in order to facilitate secure and robust data transfer. Every time the SAN changes (e.g., topology is altered, devices are added or removed) or when the VSX initializes it must perform an operation referred to as network discovery. Discovery is the act of finding or locating something, and obtaining additional information about it. Such discovery begins at the port level and ends at the services level.

All devices derive from the SAN element. All SAN devices attach to the network by means of a port interconnect. Device discovery begins at the port level. Some ports belong to connection devices such as fibre channel hubs, switches, and bridges. Such connection devices provide device-specific methods to discover what is attached to them. As the connection devices are traversed, the discovery process can ascertain the SAN topology.

Other ports permit process images to execute on them. Certain process images work together to facilitate a protocol, e.g., the SCSI (small computer systems interface) protocol. The SCSI protocol is facilitated by a SCSI target process executing on one port and a SCSI initiator process executing on another port.

The next level of discovery involves SCSI initiators and targets. The SCSI standard identifies many types of target devices. SCSI tape, array controller, magnetic disk are a few examples. Discovery functions place all target device types not supported into an unsupported table.

Supported devices are grouped into two categories: the qualified device category and the unqualified device category. A qualified device is a device which satisfies certain rules which test whether the device can operate with the VSX. For example, one rule might require that the block size of the device be 512 bytes. Another rule might require the device uses the SCSI Version 3 interface. An unqualified device may nonetheless be operable with the VSX. However, such a determination will typically require testing to determine compatibility. All qualified devices are initialized by the discovery process and announced to the storage configuration abstraction layers. All unqualified devices are brought up, should a default handler exist. Otherwise, the unqualified device is moved to the unsupported category.

During a device bring-up step, the discovery method uses standard SCSI commands to determine a device's reliability, availability, failover behavior, command support, access time, and throughput. Discovery then groups all discovered SAN devices, by attribute, and presents them to application software.

The Discovery Service is primarily responsible for propagating the Ports, Paths, Devices, and Physical LUNs (PLUNs) visible to all the Network Processors in a VSX into the Database. Discovery is initiated every time a card is powered on. Discovery can be performed on a system-wide basis, a card basis, or a port basis.

Figure 3:
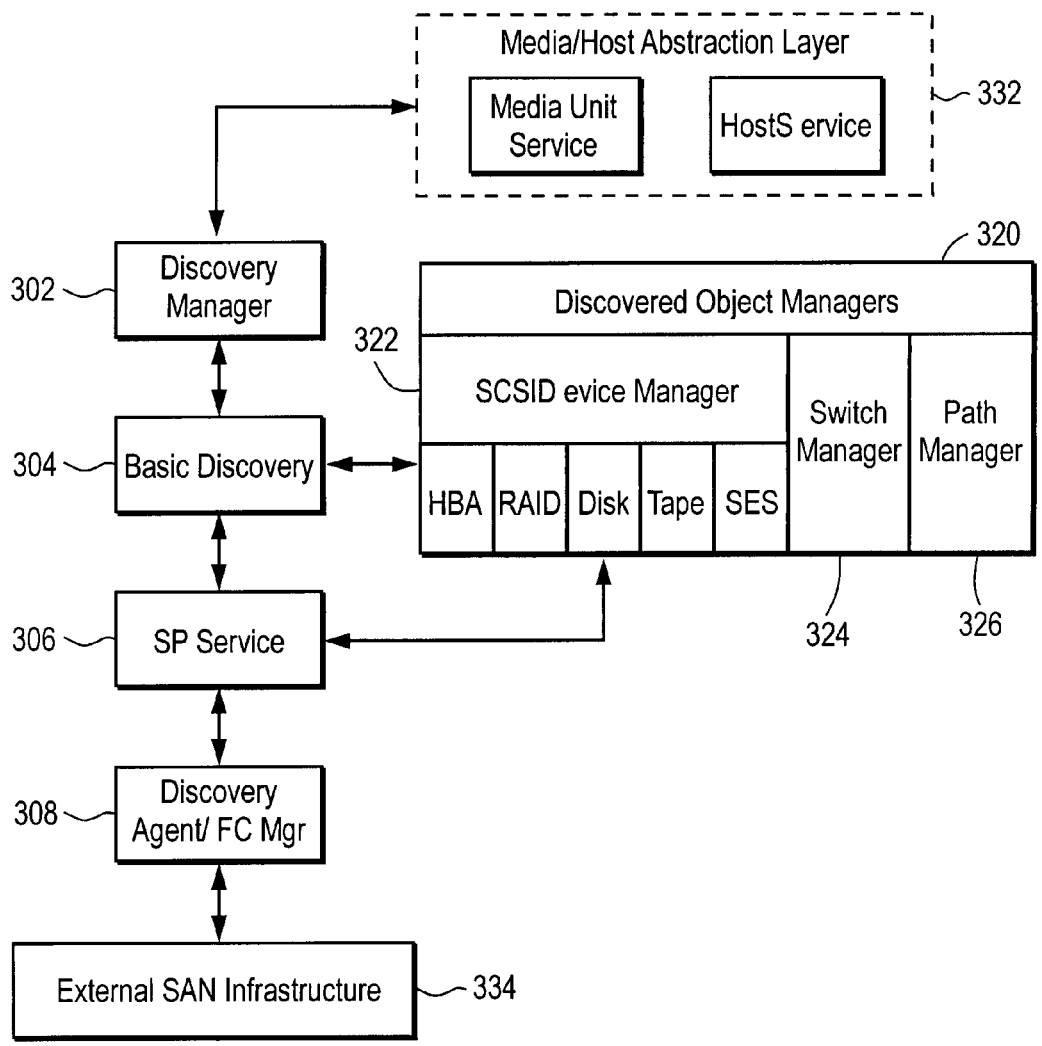
FIG. 3 is a block diagram illustrating the high level components of Discovery processing in accordance with an embodiment of the present invention.

FIG. 3 shows a block diagram of the Discovery Services according to this illustrative embodiment of the present invention. Discovery is loosely layered into four software components: the Discovery Manager 302, the Discovered Object Managers 320, Basic Discovery 304, and the Discovery Agent 308.

The Discovery Manager 302 is responsible for coordinating the discovery process and managing the consolidated discovery database. Basic Discovery 304 manages information passing between the Discovery Manager, Discovered Object Managers, and Discovery Agents.

Discovered Object Managers 320 are responsible for initializing the discovered device and making the device ready for other services. There is a Discovered Object Manager for each of kind of device that can be discovered. As can be seen in FIG. 3, there is a SCSI Device Manager 322 to manage SCSI devices. A Switch Manager 324 manages switch objects (e.g., a host bus adapter HBA) and a Path Manager 326 manages path elements of the SAN.

The Discovery Agent 308 manages the SAN infrastructure details 334. An instance of the Discovery Manager runs in each VSC. An instance of Basic Discovery runs in both VSC and LC. The Discovered Object Managers are split between VSC and LC. An instance of the Discovery Agent runs in each SP (storage processor).

Each Discovered Object requires its own Object Manager, although some Discovered Objects might share an Object Manager. The following is a list of SAN elements and their respective Managers:

SCSI Device Manager—Manages the initialization and presentation of SCSI devices.
  SSC Sequential-access device—Manages generic magnetic tape devices.
  SSC Printer device—Manages generic printer devices.
  SPC Processor device—Manages generic processor devices.
  SBC Write-once device—Manages some optical disks.
  MMC CD-ROM device—Manages CD-ROM devices.
  SGC Scanner device—Manages scanner devices.
  SBC Optical memory device—Manages some optical disks.
  SMC Medium changer device—Manages jukeboxes.
  SSC Communications device—Manages some communication devices.
  ASC IT8—Manages Graphic arts pre-press devices.
  SCC Storage array controller device—Manages RAID devices.
  SES Enclosure services device—Manages SES devices.
  Direct-access device—Manages generic magnetic disk type devices.
  RAID—Manages Direct-Access devices that are known to be RAID controllers.
  Reserved—Manages reserved devices.
  Unknown or no device type—Manages unknown device types.
Unsupported Device Manager—Manages devices for which the VSX is not qualified.
Host Manager—Manages Servers mapped to HBAs.
Port Manager—Manages both HBAs and SP ports.
Path Managers—There are two Path Managers
  Host Path Manager—Manages a connection from a SP port to a Server port.
  Device Path Manager—Manages a connection from a SP port to a storageport.

Switch Manager—Manages Fibre Channel switches.
VSX Manager—Manages other VSXs in a VSX cluster.
HUB Manager—Manages Fibre Channel HUBS.
SCSI Bridge Manager—Manages Fibre Channel to SCSI Bridges.
LAN Bridge Manager—Manages Fibre Channel to LAN Bridges.
WAN Bridge Manager—Manages Fibre Channel to WAN Bridges.

Following is a partial list of attributes for discovered objects. Attributes define particular characteristic(s) of the device. All SAN elements have a Location, HA Set ID, User Domain, and ID. The ID will be a Confluence identifier, which maps a device-specific ID to a VSX Device ID. The user will assign the User Domain, Location, Department, and HA Set ID. In the absence of a user-assigned value, the default User Domain will be "Administrator", and the default values for all other attributes will be "Unassigned". Discovery should facilitate the assignment of these user-supplied values during installation.

Figure 4:
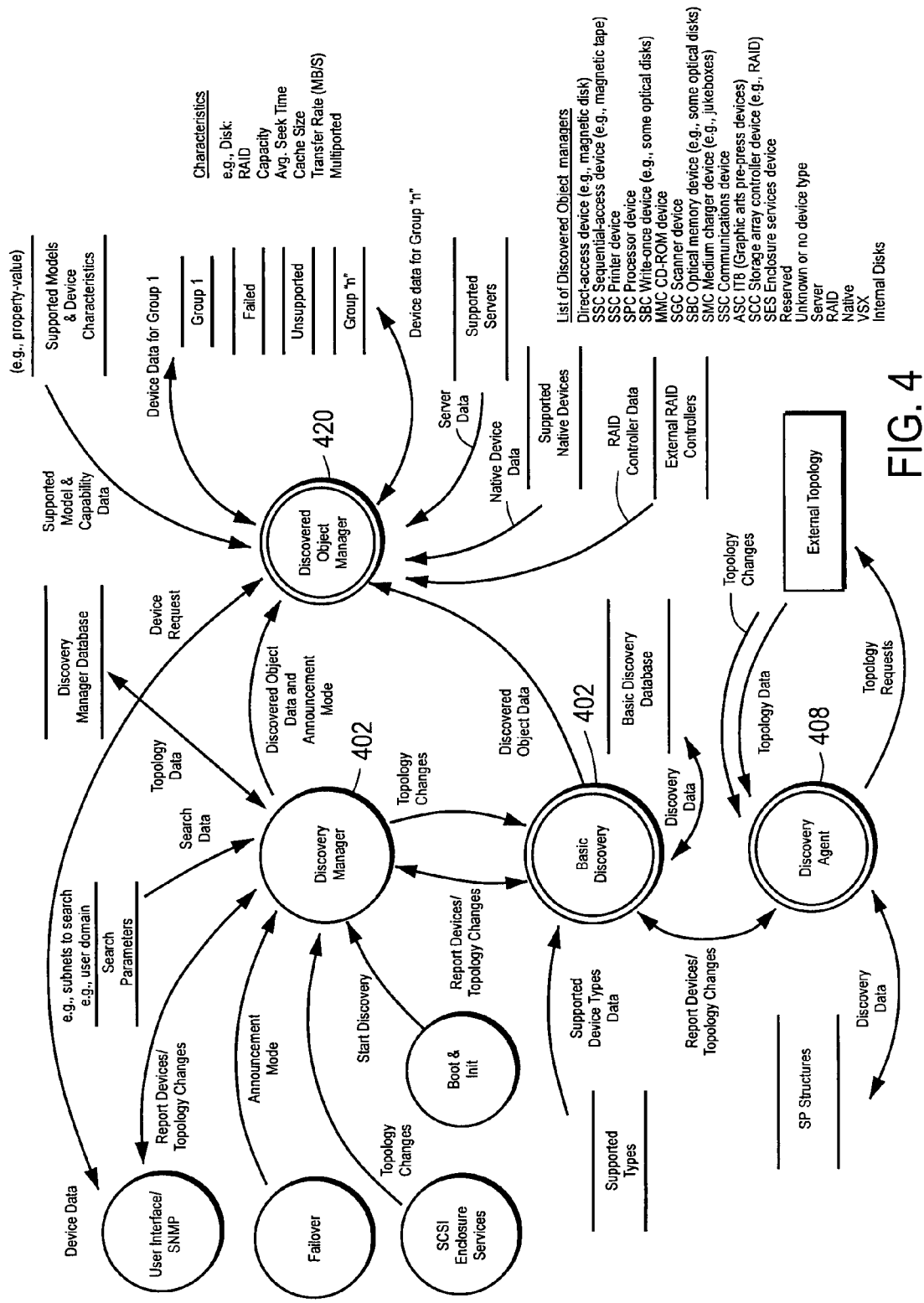
FIG. 4 is a data flow diagram showing a flow of information during Discovery processing according to an embodiment of the present invention.

SCSI Device/Physical LUN (PLUN) Attributes
  Vendor
  Model
  Serial Number
  Code Revision
  Block Size
  Capacity in blocks
  Transfer Rate
  RPM
  Multi-port information
  Cache Size
  Location
  Department
  User domain
  HA Set ID
  Tuning Parameters
  Security capabilities
  WWN
Unknown SCSI Device Attributes
  Locationo User domain
  HA Set ID
Host Attributes
  Name
  OS Type
  IP Address
  Location
  Userdomain
  Department
  Tuning Parameters
  HA Set ID
Port Attributes
  Node and Port Name
  Supported Protocols
  Class of Service
  Vendor
  Location
  User domain
  Tuning Parameters
Paths Attributes
  Transfer rate capabilities
  Latency
  Redundancy
  Tuning Parameters
  Total Connectivity Units
  Connectivity Unit Information
Internal Device Attributes
  VSX
    Name
    Location
    HA Set ID
    Cluster capabilities
    Cascading capabilities
    Tuning Parameters
  Switch Attributes
    Vendor
    Supported Protocols
    Domains
    Number of Ports
    Number of Connected Nodes
    Node Information
    Connected Node Information
    Location
    User domain
    HA Set ID
    Tuning Parameters
    Security capabilities
    WWN
  HUB Attributes
    Vendor
    Supported Protocols
    Number of Ports
    Number of Connected Nodes
    Node Information
    Connected Node Information
    Location
    User domain
    HA Set BD
    Tuning Parameters
    Security capabilities
    WWN
  Bridge Attributes
    Vendor
    Supported Protocols
    Number of buses
    Number of connected physical LUNs
    Location
    User domain
    HA Set ID
    Tuning Parameters
    Security capabilities
    WWN Discovery Process Referring to FIG. 4, a high level data flow diagram shows the flow of data during Discovery processing in accordance with an embodiment of the invention. The Discovery Manager process 402 issues a request to each Basic Discovery process 404 to report on its devices. In turn, the Basic Discovery process will issue a request to one or more Discovery Agent process 408 to report on its devices. Each Discovery Agent will probe the external network and send the device information to Basic Discovery as it's being discovered. Basic Discovery will announce each discovered element to its respective Discovered Object Managers 420 which in turn will perform device bring-up and initialization. This process will continue until Basic Discovery is done for all external devices. Basic Discovery will verify support for each device before announcing each supported device type to its Device Manager. In addition, each Discovered Object Manager will also verify support within its particular device. Once support is verified, additional device initialization is then performed by the Discovered Object Managers.

Each Discovered Object Manager 420 implements the device-specific discovery, characterization, and profiling. For each qualified device, a table of bring-up, characterization, and profiling parameters is consulted for the command group and operation code required to perform the specific discovery, characterization, or profiling procedure. The bring-up group will contain the codes for initializing the device. The programming group will contain the codes for programming the logical unit's mode pages. A group for failover processing will contain the codes for failover. The Discovery Service will dynamically generate the sequencer for the function by using the parameters for the device from the table. The command codes are not SCSI operation codes but are internal operation codes that associate with handlers that perform the corresponding operation. For example, it could be a SCSI operation or some operation to program the logical unit.

Figure 5:
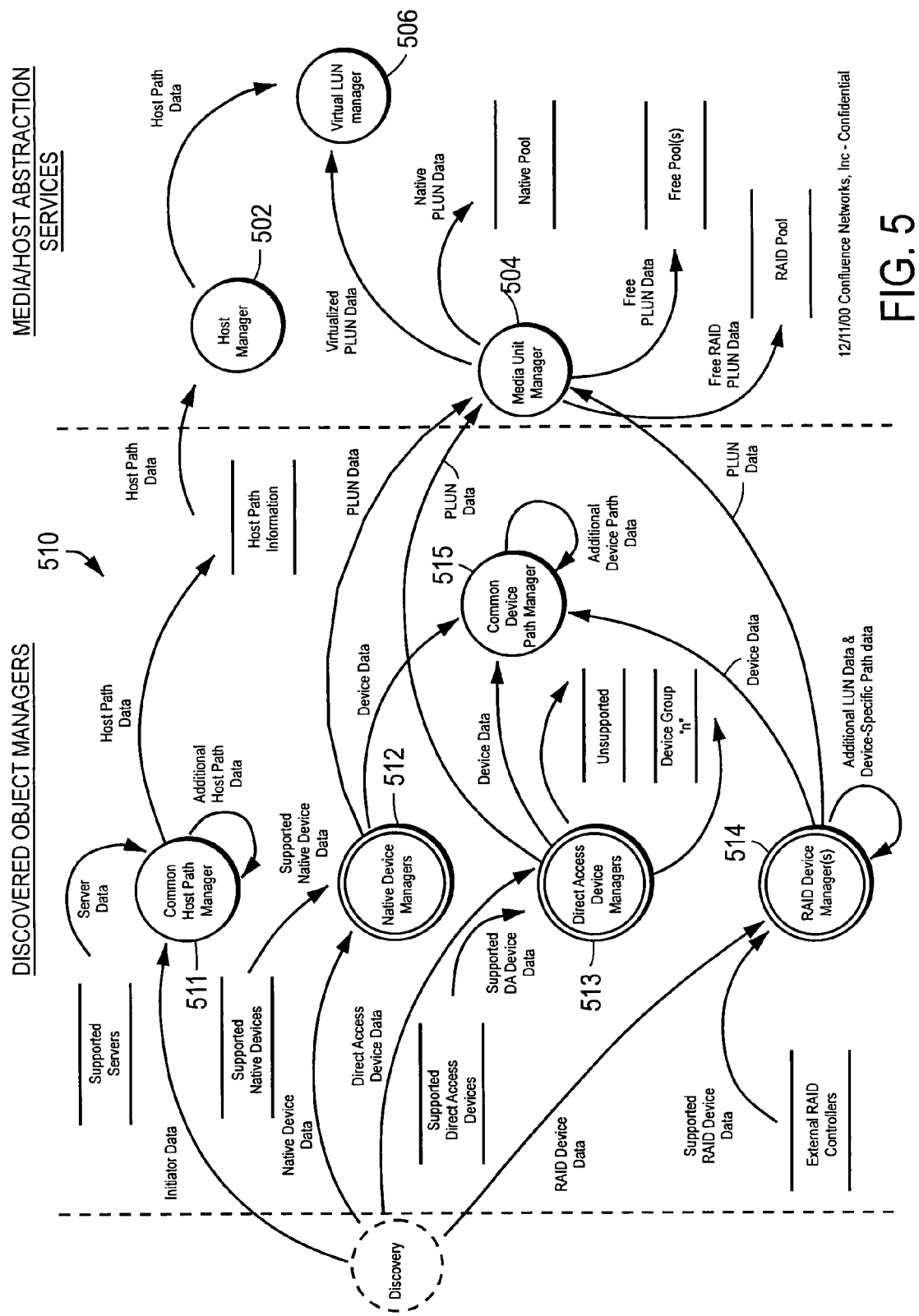
FIG. 5 is data flow diagram showing a flow of information during a process which occurs subsequent to Discovery processing in accordance with an embodiment of the present invention.

FIG. 5 is a data flow diagram showing the flow of information from various Discovered Object Managers 510 to a Media Abstraction Manager 504 and a Host Abstraction Manager 502. The figure shows typical Discovered Object Managers such as a Common Host Path Manager 511, a Native Device Manager 512, a Direct Access Device Manager 513, a RAID Device Manager 514, and a Common Device Path Manager 515. Media and Host Abstraction Layer Announcements will be conditional for all multi-ported devices based on Failover for high availability.

Paths that connect an Initiator Port to an SP Port are mapped to HBA objects. These HBAs are then mapped to Host objects. The creation of Host objects will be a manual process. The mapping of HBAs to these Hosts will be an automatic process. The HBA, Host, and Path information will be made available to create Host LUNs.

Paths that connect a Target Port to one SP Port are combined into various SCSI target devices and are grouped according to the SCSI standard. For RAID controllers pretending to be Direct Access Devices, identifying the storage as RAID will be a manual process.

All discovered objects are subject to support. Each supported external device will have a Device Characteristics Profile, from which the Device Manager can group devices within type. This requires manual setup at the factory. Initially, two simple classifications can be maintained:

RAID should be separated from DISK storage devices
Single ported downstream storage devices should be separated from multi-ported storage devices.

Classifications should be easily added in the form, "Property=Value"; e.g., Performance=10.

Figure 6:
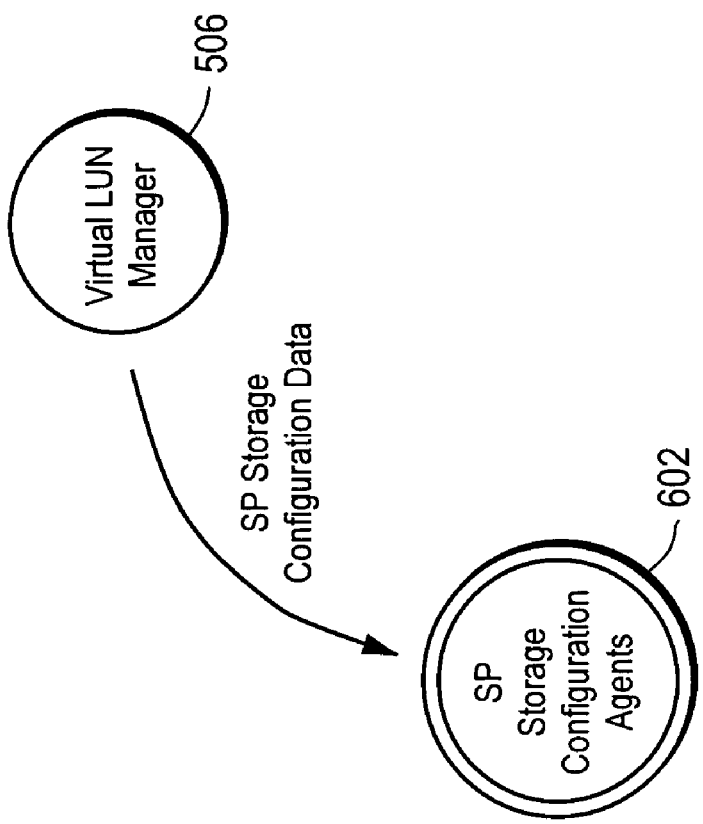
FIG. 6 is a data flow diagram illustrating a flow of information while configuring storage in a storage processor.

Once the Host Manager 502 and the Media Manager 504 match the Discovered Physical Devices with the Configured Virtual Devices, the Virtual Devices need to be given back to the SPs so the VSX can do IO. FIGS. 5 and 6 show the data flow diagrams for configuring storage on the SPs. The Virtual LUN Manager 506 receives information relating to the configured virtual devices (FIG. 5) and distributes configuration parameters to each SP in the VSX (FIG. 6). A storage configuration agent 602 running on the SP manages adding and removing tables and data structures.

When all SPs and Object Managers are done, Basic Discovery will send its reply back to the Discovery Manager. The Discovery Manager will wait until Basic Discovery is done on all VSX cards before announcing the external objects to the Host and Media Managers. The Path Managers will analyze each initiator and target device for additional paths. When done the Physical LUN information can be announced to the LUN Service. At this stage, Discovery is complete.

Figure 7:
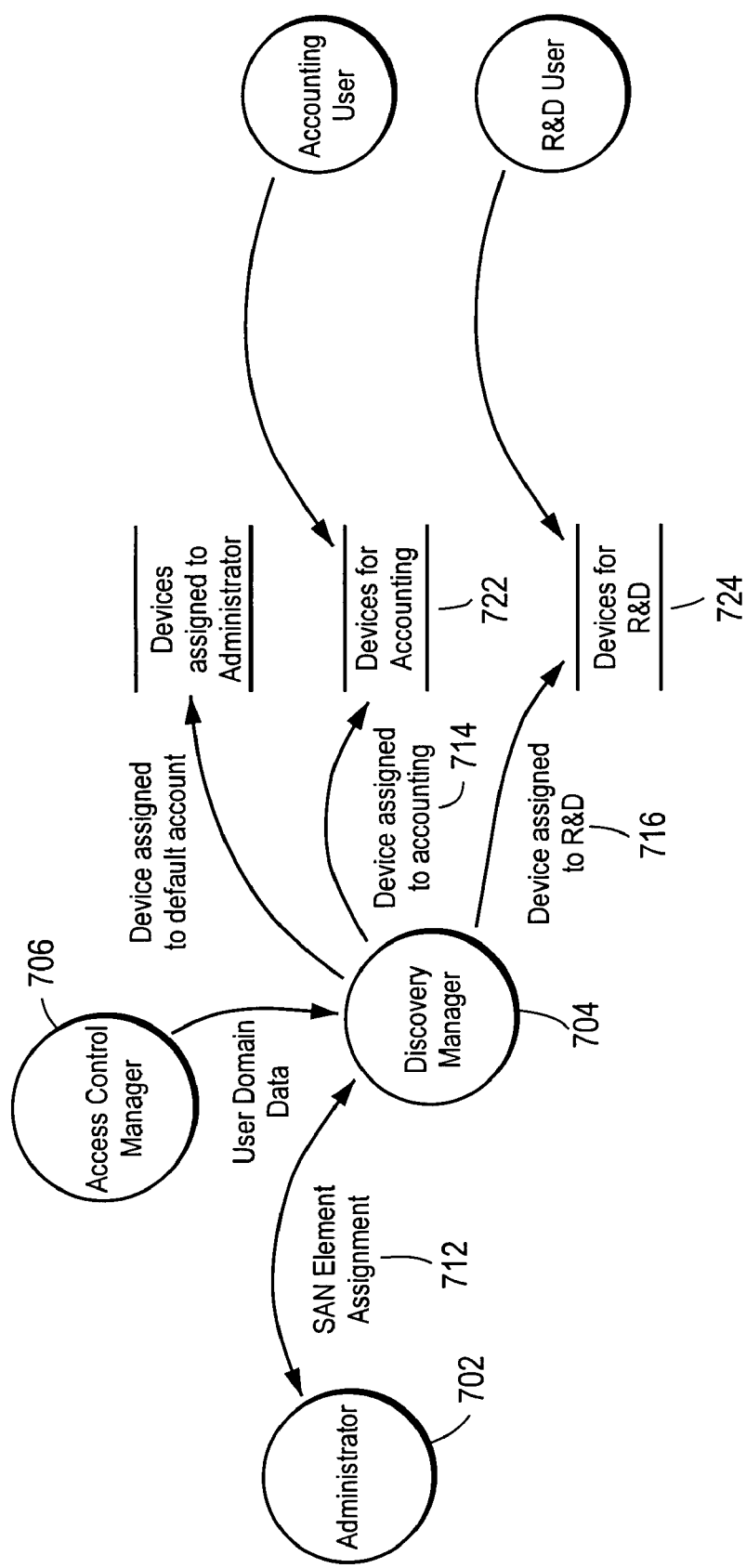
FIG. 7 illustrates administration activity according to an embodiment of the present invention.

FIG. 7 shows an Administrator 702 assigning a storage device to a user domain. For example, the figure shows the Administrator communicating assignment information 712 to the Discovery Manager 704 relating to SAN elements for user domains. An Access Control Manager 706 manages user domains and user accounts within the user domains, including defining user domains, their users, access privileges and so on. The Access Control Manager informs the Discovery Manager of the different user domains. For example, Discovery Manager stores information relating to an "accounting" user domain 714 and information relating to an "R&D" user domain 716 in respective data stores 722 and 724. After the assignment is made, only the administrator or the assigned user group can view the device.

In accordance with the embodiment of the present invention, a discovered physical device can be associated with one or more virtual devices (VLUN). Moreover, each PLUN can be associated with one or more virtual devices. Furthermore, a physical device can have two or more associated PLUNs. Such assignments are handled by the Virtual LUN Manager 506. From this, it can be seen that a physical device can be assigned to more than one user domain. The higher-level storage abstractions created from the device inherit the same user domain. In this way users will see only those devices to which they have been granted access by the administrator, establishing a "Virtual" data center for each user domain.

The user can configure the Discovery Manager to periodically take an inventory of a SAN's physical topology. The user can then generate reports that show the differences between two baselines. This capability enables the user to better plan a data center's growth.

When instructed by the user, or from a user-based policy, the Discovery Service obtains a baseline inventory of all SAN elements in the SAN. Should the policy request, the Discovery Service will compare the new baseline to the existing baseline and report the differences between baselines. Later, Discovery could use a known baseline by which devices could be found. Discovery Performance can be improved by providing search parameters to the Discovery Manager. For example, a list of subnets to search could be provided as a parameter.

Figure 8:
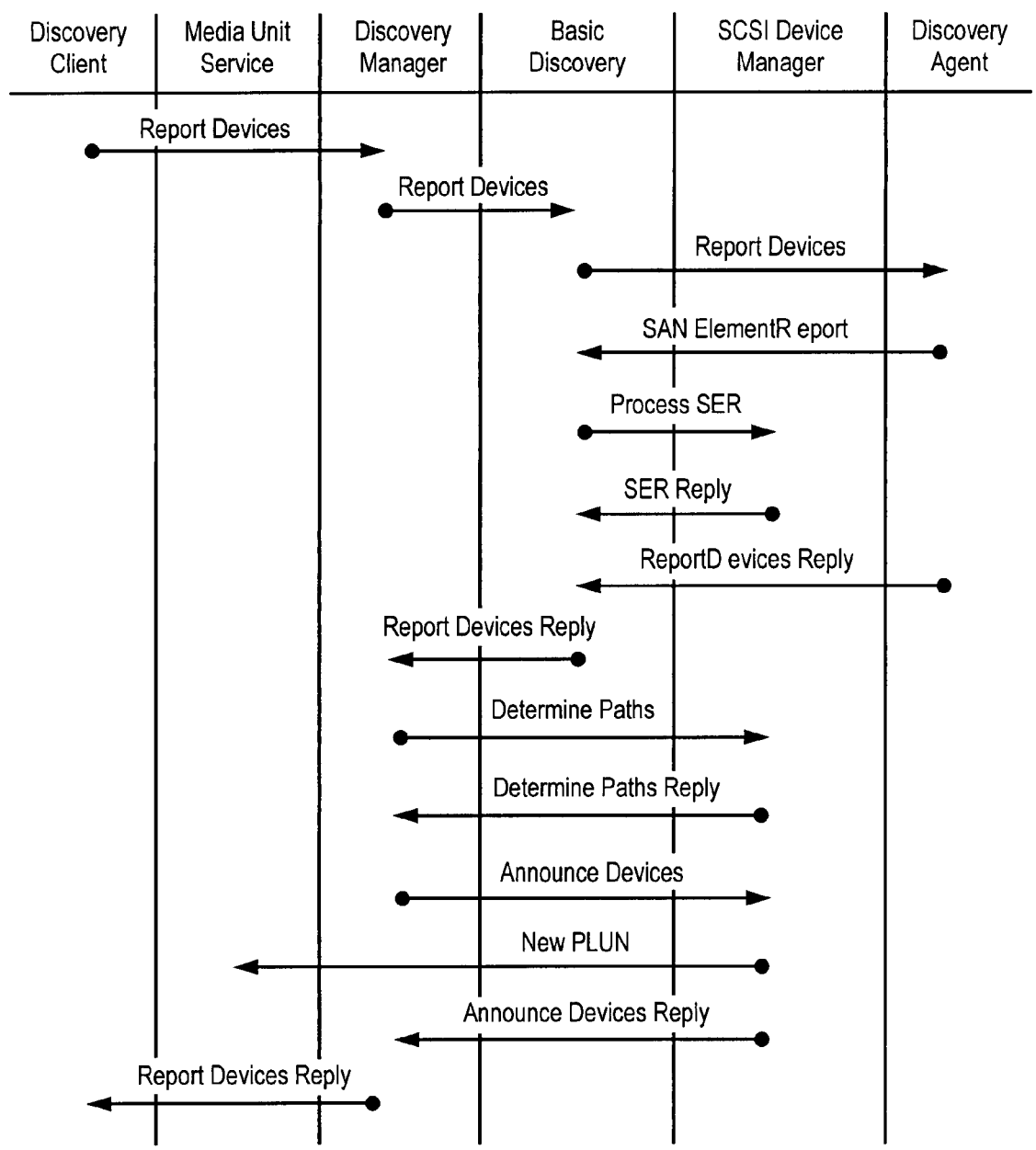
FIG. 8 shows a sequence diagram of Discovery processing according to an embodiment of the invention.
Figure 9:
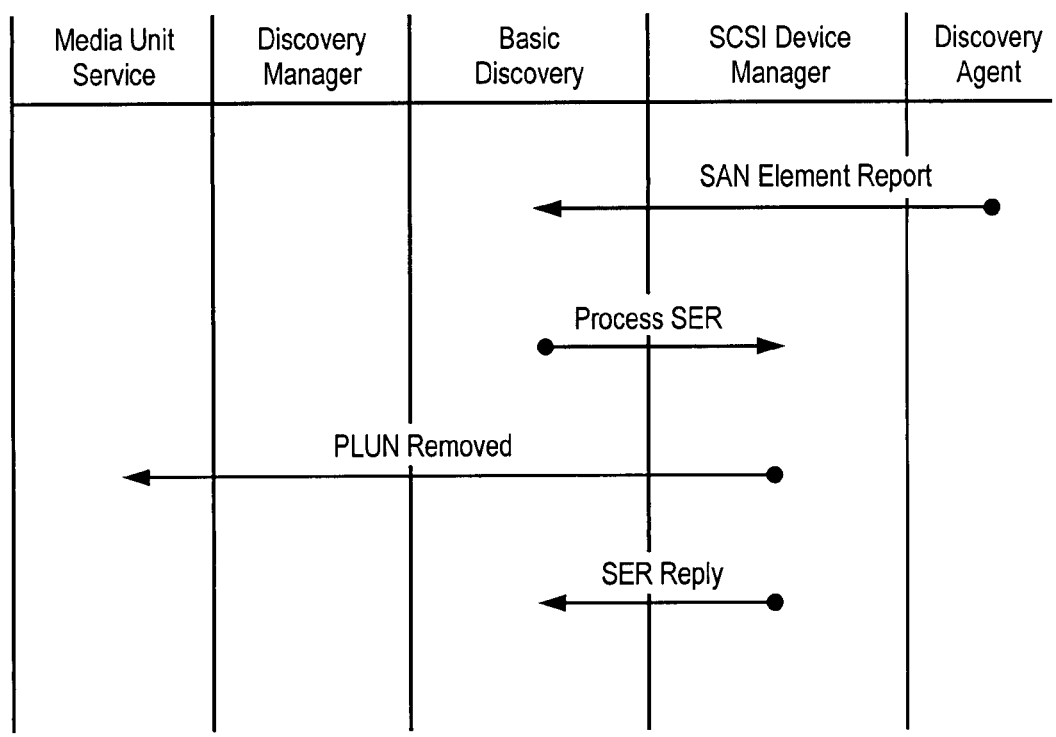
FIG. 9 shows a sequence diagram of device removal in accordance with an embodiment of the present invention.

FIG. 8 shows the sequence of commands and events that occur during the Discovery Process for adding a single new SCSI device. FIG. 9 shows the sequence of commands and events that occur when a SCSI device is removed.

Discovery Manager Responsibilities

The Discovery Manager coordinates Discovery Service operations between the VSCs, Discovered Object Managers, and Basic Discovery. The Discovery Manager will consolidate all Basic Discovery information into one database. The Discovery Manager will send out a Report Devices command to all Basic Discovery Engines. When all the responses return, the Discovery Manager will have a complete picture of the devices attached to the VSX.

Failover will instruct the Discovery Managers which mode to use when announcing the external hosts and devices to the Discovered Object Managers for further bring-up processing and abstraction. There are two levels of announcements, Device Level announcements, and Media Level Announcements.

Device Level announcements instruct the Device Managers to perform all additional bring-up on the device, but not to make the media available to the Media Layer. Media level announcements instruct each Device Manager to bring up the device and inform the Media layer of new devices found. Only dual ported devices are subject to device level announcements.

The Discovered Object Managers on the Master VSC will do media level announcements of discovered devices. The Discovered Object Manager on the Slave VSC will do device level announcements only. That way, if there's a VSC failover, all the Slave Discovered Object Manager has to do is announce the media to the Media Layer.

In a VSX cluster, both Discovered Object Managers in either VSC will do device level announcements only. After determining device ownership, Failover will instruct the Device Manager which devices require media level announcement.

Basic Discovery Responsibilities

Basic Discovery coordinates Discovery Service operations between the Discovery Agents running on the SPs. When Basic Discovery is started, it remains dormant until a Report Devices message is received. At that time, it will query each of the Network Processors on its card for their discovery data. Discovery Agent events will be passed on to the Discovered Object Managers for processing. A reply to the Report Devices message will be sent after the database has been completely updated. Basic Discovery is also responsible for passing along topology changes to Discovery Managers as well as Discovery Object Managers.

Discovery Agent Responsibilities

Discovery Agents will initiate discovery as part of the functional code at initialization time and at run time. When the Agent receives the Report Devices command it will cause the FC Manager to probe the SAN.

Initiator SP Ports will perform initiator based discovery operations. Target SP Ports will perform target based discovery operations. Initiator and Target SP Ports will perform both initiator and target based discovery operations. What discovery operations are performed will depend on the SCSI role and the fibre channel topology. FCAL, Point-to-Point, and Fabric all support different discovery mechanisms. FCAL discovery will cause Loop Initialization (LIP). Fabric discovery will use the Fabric Name Server. Port Login and Process Login are common to all FC topologies. The higher layer software will flag conflicts such as an initiator discovering another initiator.

For each unknown discovered device the SP will create the following data structures:
 For each target device discovered by an initiator do
  Create a pDevPath and a pLUN for target LUN 0. The pLUN attributes should include:
   Peripheral Device Type set to UNKNOWN
   LUN set to 0
   Path Count set to 1
   Handle
  Generate a SAN Element Report
 For each initiator device discovered by a target do:
  Create a pDevPath and a generic hLUN. The hLUN should be used for requests to all supported logical unit numbers. The hLUN attributes should include:
   Unit Attention Set to Power On Reset
   Access set to READ/WRITE
   ASC and ASCQ set to NOT READY, BECOMING READY
   Peripheral Device Type set to UNKNOWN
   Peripheral Qualifier set to CONNECTED
   Handle
  Generate a SAN Element Report
  New commands for any generic hLUN received from an initiator should respond with CHECK CONDITION, NOT READY, BECOMING READY After the discovery process ends, the SP will have a structure for each initiator and target port (portCB), and each target logical unit (pLUN and hLUN). The Discovery Agent will assign the handle for each discovered object. The handle will be used to identify the device when performing a device operation.

The SP will retain these structures and behavior until receiving a Configure SP command. The SP will initiate discovery in the VSC in the same way as on the line card. A Report Devices command response will be sent to Basic Discovery when the SP is done.

The Discovery Agent is responsible for reporting all network specific information and generic device information.

Discovered Object Manager Responsibilities

Figure 10:
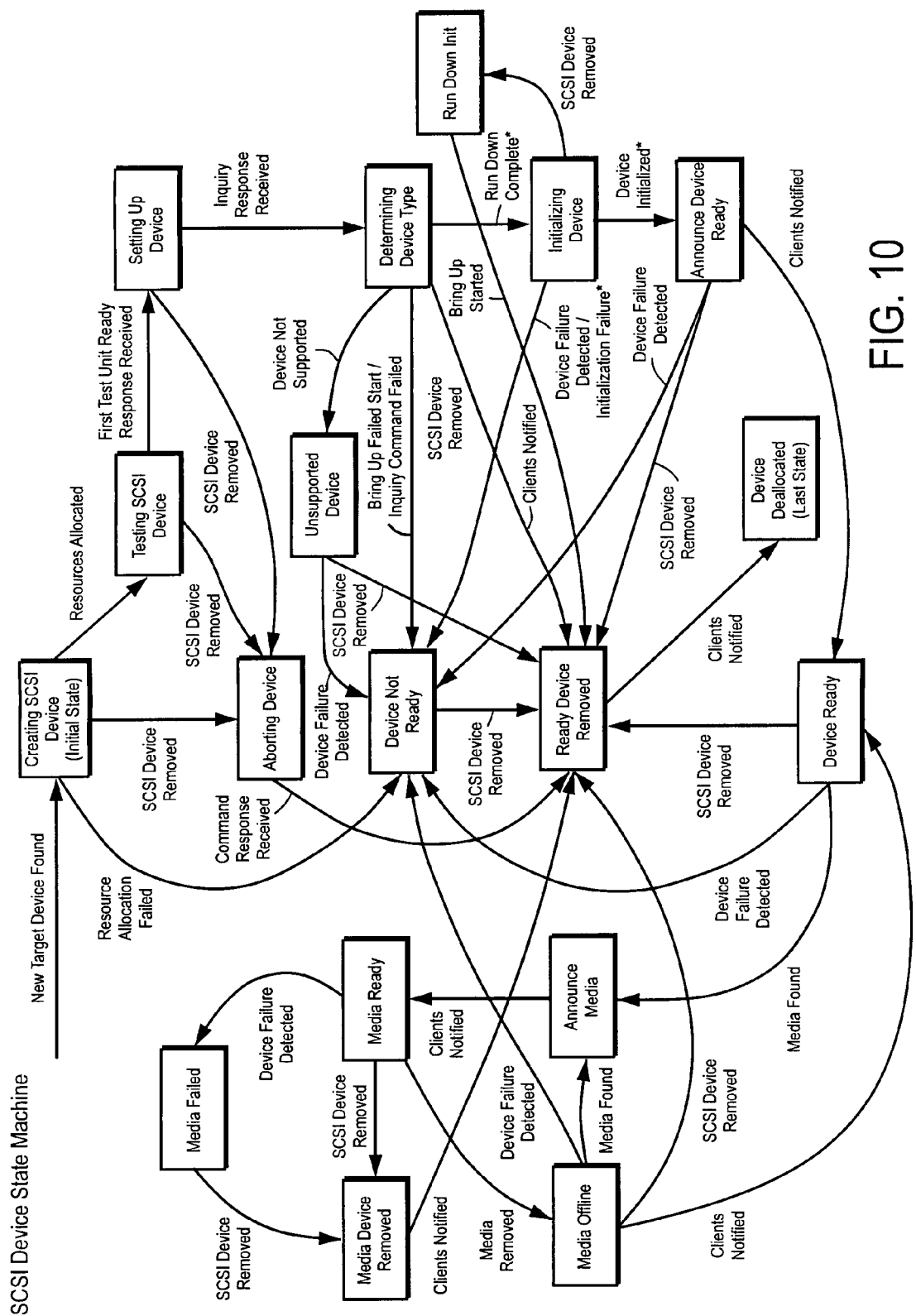
FIG. 10 shows a state transition diagram for SCSI device processing according to an embodiment of the present invention.

Discovered Object Managers are responsible for initializing the discovered device, if necessary, and making the device ready for other services. They also provide a client interface that is device-specific. Following is a description of the SCSI Device Object Manager. The device management state machine is shown in FIG. 10. The discussion of the SCSI Device Object Manager is an example of a Discovered Object Manager, illustrating the typical functions provided by a Discovered Object Manager. It is understood that similar manager processes are needed for device types other than SCSI devices.

SCSI Device Manager

Storage Devices encompass a variety of existing and future types of devices that provide the capability of storing information permanently onto Physical Volumes. Types of storage devices are distinguished by their interface characteristics that generally determine their management behavior.

SCSI Storage Devices are an example of such storage devices, having a SCSI type of interface and responding to well-known SCSI protocols. The SCSI Device Manager is concerned only with SCSI type Storage Devices. No form of SCSI is excluded from what the SCSI Device Manager is required to manage (i.e., SCSI-I, SCSI-2, etc.). Other types of Storage Devices will require implementation of other device managers, as exemplified by the SCSI Storage Devices.

a. Storage Device Management

The SCSI Device Manager is required to provide the following storage device management functions:

The SCSI Device Manager manages the database of descriptions of SCSI devices. This includes creation of database entries when devices are first recognized, modification when state changes occur on the device, and removal of entries when devices no longer exist.

The SCSI Device Manager is required to respond to notification from Discovery regarding the current status of the storage devices.

The SCSI Device Manager must be able to perform all required functions on any type of SCSI device. Only the SCSI Device Manager should need changes for VSX to support new types of SCSI devices.

The SCSI Device Manager defines the failure modes and error recovery mechanisms for all SCSI device types. This provides a centralized database for all types of failures for such a device cross-matched with the error recovery mechanism for the defined failure mode. This information is provided to the Fault Management subsystem to provide full fault management of SCSI devices.

b. Storage Device Initialization

The SCSI Device Manager manages bring-up of the SCSI devices. In this role, the SCSI Device Manager is responsible for determining the initial state of the devices when it is presented to it by the Discovery Manager. It must then perform whatever action is necessary to take to bring the device to a state of readiness so other services can use it. The Bring-upstate machine is shown in FIG. 11.

Figure 11:
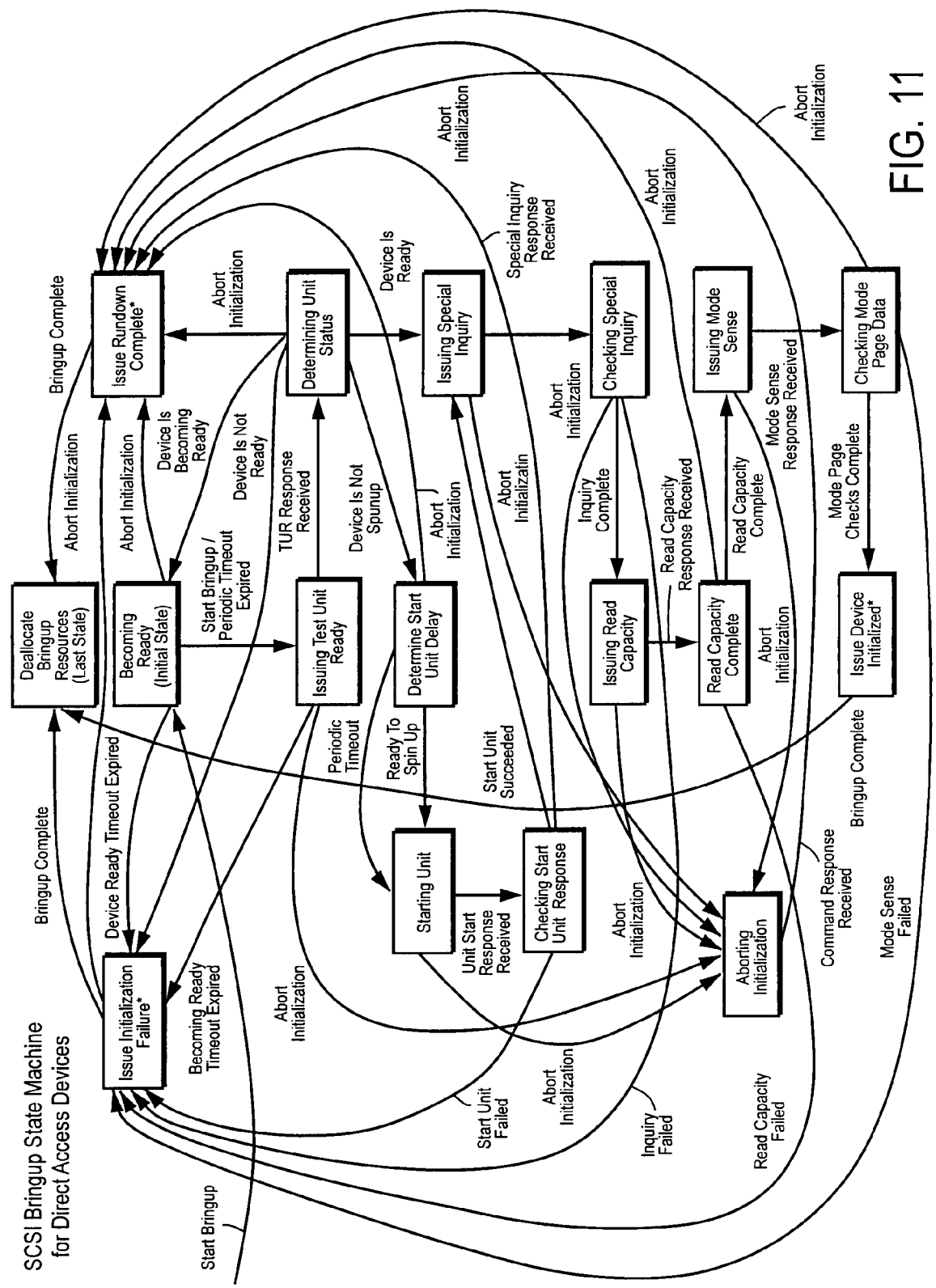
FIG. 11 shows a state transition diagram for SCSI bring-up processing in accordance with the invention.

Each Logical unit should be brought up using the state machine in FIG. 11. This state machine could be easily modified to support RAID Controllers and Report LUNs.

c. Client Interface

The SCSI Device Manager provides registration services for clients who wish to be informed when SCSI devices come into and go out of the system. This includes providing notification services to registered clients for changes that occur on devices such as failures, readiness, etc.

The SCSI Device Manager also provides an ownership scheme whereby clients can reserve a SCSI device for exclusive access. Other clients will not be informed of the device's existence when another client has exclusive access to the device.

The SCSI Device Manager provides standard interfaces to clients for common services provided by all device managers. The SCSI Device Manager provides translation services for all native device requests addressed to a device. The SCSI Device Manager accepts requests from clients. All IO requires client-supplied buffers.

HBA Manager

Figure 12:
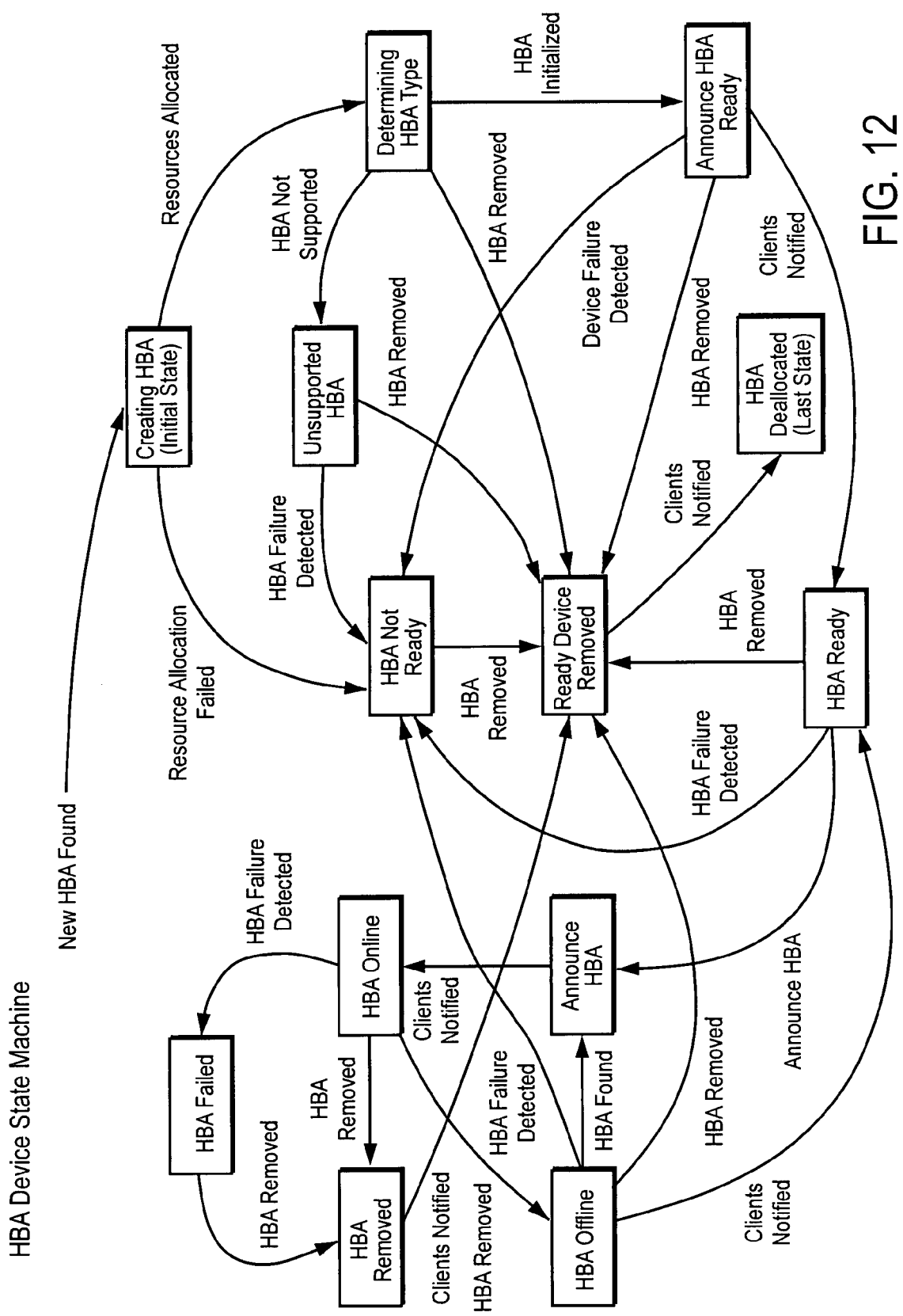
FIG. 12 shows a state transition diagram for HBA processing in accordance with the invention.

Host Bus Adapters, or HBAs, encompass a variety of existing and future types of devices that provide the capability of interfacing a Server to the SAN infrastructure. The HBA management state machine is shown in FIG. 12. Types of HBAs are distinguished by their interface characteristics that generally determine their management behavior.

Fibre Channel HBAs are those HBAs that have a fibre channel type of interface and respond to fibre channel protocols. The FC HBA Manager is concerned only with fibre channel type HBAs. The IP HBA Manager is concerned only with IP type HBAs.

a. HBA Management

The HBA Manager is required to provide the following device management functions:

The HBA Manager manages the database of descriptions of HBA devices. This includes creation of database entries when devices are first recognized, modification when state changes occur on the device, and removal of entries when devices no longer exist.

The HBA Manager is required to respond to notification from Discovery regarding the current status of the HBAs.

The HBA Manager must be able to perform all required functions on any type of HBA device. Only the HBA Manager should need changes for VSX to support new types of HBAs.

The HBA Manager defines the failure modes and error recovery mechanisms for all HBA types. This provides a centralized database for all types of failures for such a device cross-matched with the error recovery mechanism for the defined failure mode. This information is provided to the Fault Management subsystem to provide full fault management of HBA devices.

b. HBA Initialization

The HBA Manager manages bring-up of the HBA devices. In this role, the HBA Manager prepares the HBA for abstraction. There are currently no special operations to perform on an HBA for bring-up.

c. Client Interface

The HBA Manager provides registration services for clients who wish to be informed when an HBA comes into and goes out of the system.

The HBA Manager provides notification services to registered clients for changes that occur on HBAs. These include failures, removals, etc.

The HBA Manager provides standard interfaces to clients for common services provided by all device managers such as Vendor retrieval.

Path Manager

Figure 13:
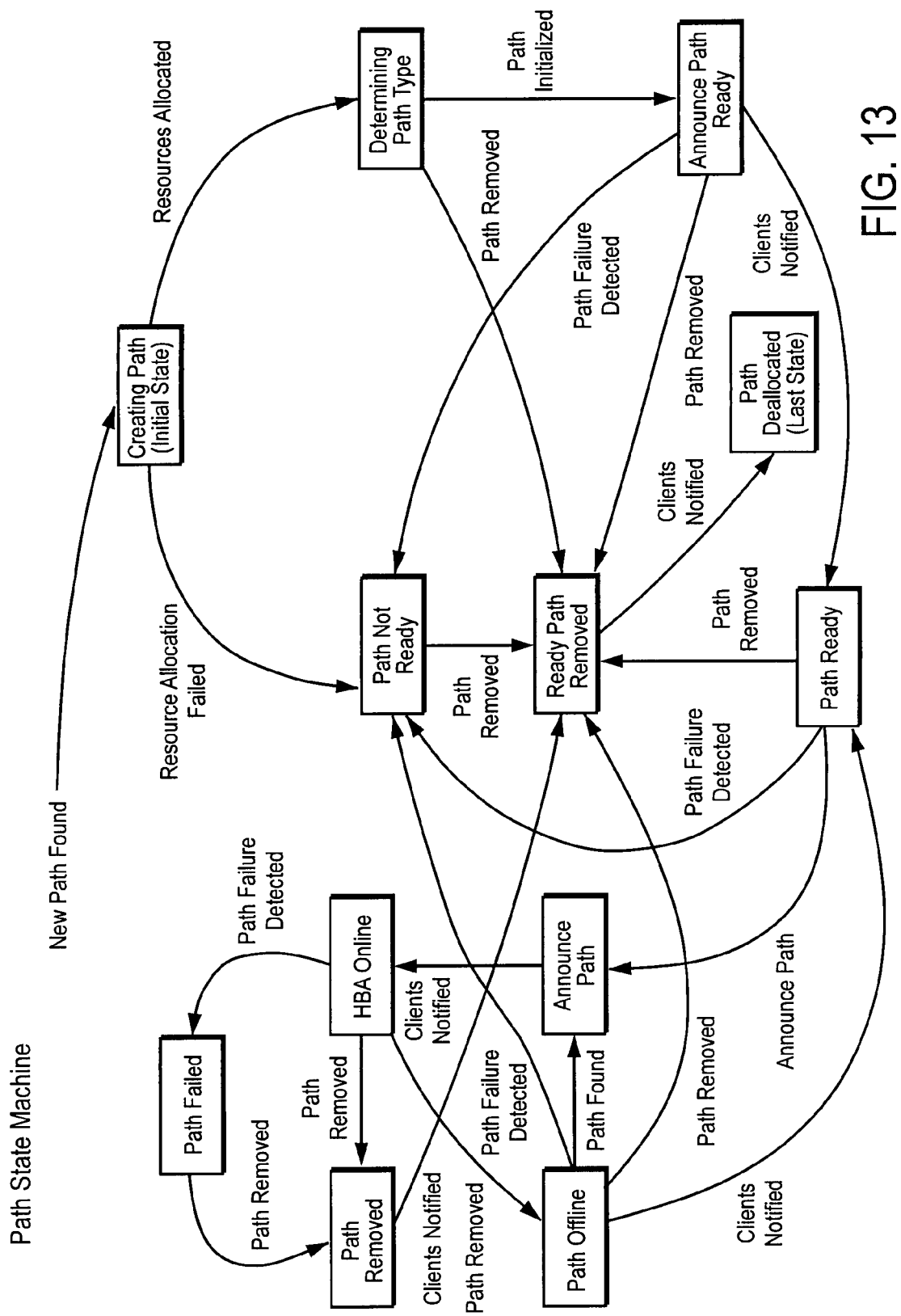
FIG. 13 shows a state transition diagram for PATH discovery processing in accordance with the invention.

The Path Manager identifies routing and pathing choices from the Server to its storage. The path management state machine is shown in FIG. 13. A Path is a logical connection in the SAN infrastructure used for data transfer between a Server and the VSX, or between the VSX and a Storage Element. As such, there are two distinct path types, Server Paths and Storage Paths. Server paths provide the capability of transferring data between computer systems (Servers) and the VSX. Storage paths provide the capability of transferring information between storage elements and the VSX.

a. Path Management

The Path Manager is required to provide the following path management functions:

The Path Manager manages the database of Path descriptions. This includes creation of database entries when paths are first recognized, modification when state changes occur on the path, and removal of entries when paths no longer exist.

The Path Manager is required to respond to notification from Discovery regarding the current status of a path.

The Path Manager must be able to perform all required functions on any type of path. Only the Path Manager should need changes for VSX to support new types of Paths; e.g., Path from one VSX to another VSX.

The Path Manager defines the failure modes and error recovery mechanisms for all path types. This provides a centralized database for all types of failures for paths cross-matched with the error recovery mechanism for the defined failure mode. This information is provided to the Fault Management subsystem to provide full fault management of paths.

b. Path Initialization

The Path Manager does not participate in path initialization. It is the device-specific manager that determines path initialization as a byproduct of the device bring-up. In this role, the Path Manager is responsible for determining multiple access paths of a device when it is presented to it by the Discovery Manager. It must then analyze the path data in order to bring the HBAs or storage elements to a state of readiness so the abstraction layer can use it.

c. Client Interface

The Path Manager provides registration services for clients who wish to be informed when Paths come into and go out of the system.

The Path Manager provides notification services to registered clients for changes that occur on paths. These include failures, readiness, etc.

The Path Manager provides standard interfaces to clients for common services provided by all device managers.

Managing Topology Changes

There will be topology changes that occur asynchronously from the SPs. The network itself can change through the addition or removal of a device in the network. These will cause the database to be updated and changes propagated back to the Device Managers as needed without the need for Report Devices.

Only changes will be reported. The Discovery Agent will report changes to Basic Discovery. Basic Discovery will report changes to the Object Managers and to the Discovery Manager. The Object Managers will propagate changes to the LUN services for media announced devices. An Add or Remove operation for a device level announcement would not affect the media layer but would be announced to clients requesting this notification. Changes will be expressed as additions or subtractions.

Device removals are detected in several ways. The IO path can detect the device being removed through command time outs. The Fibre Channel layer can detect the device being removed through Loop Initialization Processing or a switch Name Server. An SES Manager can detect a device being removed using the SES protocol. When notified of device removals the SP will abort all outstanding IO to the device, re-route the IO if programmed to, and remove the associated data structures.

Additions can be detected through SES or the SP. Any additions such as a new host login will cause discovery to be restarted on that SP. New upstream or downstream devices will cause the SP to again create default LUN structures to handle IO requests. IO to existing devices will be unaffected.

Managing Discovery on Demand

After the VSX is operational, the user can invoke Report Devices to the Discovery Manager at any time to refresh the information in the Database. Report Devices can be invoked on the VSX as a whole, on a particular card, or on a particular SP. Only one Report Devices command is active at any one time on each SP. If a Report Devices comes in during Report Devices processing, the response is held off until the process is complete. Again, only changes will be reported. Re-discovery will not impact IO operations.

Discovery Operations

Initialize—Initialize instructs the Discovery Service to perform subsystem initialization.

Enable—Enable instructs the Discovery Service to activate the subsystem for command and event processing.

Disable—Disable instructs the Discovery Service to quiescence for shutdown.

Report Devices—Report Devices instructs the Discovery Service to re-scan all or some of the VSX interfaces for attached devices and report back when done. The Topology Data returned from the scan operation is saved in the Database. Some or all of the topology is announced to the caller.

Create Baseline—Create Baseline instructs the Discovery Manager to save the live configuration into a baseline.

Report Baseline Changes—Report Baseline Changes queries the Discovery Manager for the difference between the baseline configuration and the live configuration.

Report Network Performance—Report Network Performance instructs Discovery to discover the performance characteristics of the network.

Report Failed SAN Elements—Report Failed SAN Elements instructs Discovery to retrieve all the SAN elements whose status is failed.

SAN Element Report—SAN Element Report is an event that notifies the Discovery Service that the external port topology has changed. The SP is the source of the event. There are four different types of event reports.

Discovery Service Context

Other software that uses this service includes:

User Interface (CLI or GUI)—The User Interface uses Discovery Services to enable the customer to visualize the SAN to achieve a number of tasks, such as hardware connectivity.

SNMP—SNMP uses Discovery Services to identify the VSX itself, manage reporting faults and for certain storage configuration.

Storage Allocation—Storage Allocation uses Discovery Services to differentiate between types of storage being used for allocation.

Storage Access and Security—LUN Masking uses Discovery Services to identify Hosts and HBAs.

Inventory and Asset Management—Inventory and Asset Management use Discovery Services to help determine the correct allocation of network resources.

Capacity Planning—Capacity Planning uses Discovery Services to determine and report on the capacity of various pools of storage LUN Service—PLUN Object Managers provide PLUN to the LUN service for abstraction Host Service—HBA Object Managers provide HBAs to the Host Service for Serverabstraction.

Other software this service uses includes:

Failover—Failover identifies to Discovery Services which devices get media announcements Chassis Service—Chassis Service provides the SP port, Line Card, Virtual Storage Controller, and other hardware objects VSX Configuration—Provides events that cause auto-discovery: LC changed, Port changed System Software—System Software provides infrastructure specific probing and topology change management to Discovery Services The invention provides an automated method for discovering and classifying information about a fibre channel device in a network that significantly improves the widely used manual method of discovery and classification. Specifically, the invention provides a method for determining a storage device's reliability, availability, failover policy, command support, access time and throughput automatically. To accomplish the fibre channel device discovery and classification, standard SCSI commands are sent to the storage device.

The invention provides an important technical advantage by discovering a device's reliability by distinguishing RAID versus non-RAID storage devices using the SCSI Inquiry command. For example, a RAID logical unit's reliability rating is higher than a physical disk logical unit's reliability rating.

The present invention provides another technical advantage by discovering a fibre channel storage device in a storage area network that is highly available using the multi-port indicator and device identifier vital product data page.

The invention provides another technical advantage related to multi-pathing by discovering a device's multi-port failover behavior using standard SCSI commands. Multiple read requests are sent to both device ports simultaneously. If both ports can sustain command, data, and status transfers the device is classified as Active-Active. If only one port can be used at a time, the device is classified as Active-Passive. Such multi-path behavior can be matched to a computer system's multi-path behavior automatically, without the user having to guess.

The invention provides another technical advantage related to command compatibility between storage devices and servers by discovering a storage device's command support. Requests are sent to the storage device to inquire whether the command is supported or not. Unsupported commands can be emulated in the VSX. The command set support can be matched to a computer system's command set support thereby providing compatibility between two entities that would otherwise be incompatible.

The invention also provides another technical advantage by discovering the access time of a fibre channel storage device in a storage area network by issuing block level I/O requests and measuring the time it takes the device to return the first byte of data.

The invention also provides another technical advantage by discovering the data rate of a fibre channel storage device in a storage area network by issuing block level requests and measuring the amount of data transferred per unit time.

The invention also provides another technical advantage by grouping devices into classifications by attributes for application software. Applications can then satisfy storage requests based on device characteristics.

The invention also provides a technical advantage by providing a scheme that allows device support to be specified and added very easily and in some cases without code recompilation. The general idea is to create a table of device bring-up parameters for each qualified device. This table of parameters will essentially contain the command group type and command operation code for each behavior that needs to be executed for the storage device. The codes map to internal VSX state machine sequencers. The behaviors supported are device bring-up, failover, and other in-band management functions, such as LUN configuration.

The invention also provides a technical advantage facilitating global storage management and security by providing the user the capability of assigning a SAN device to a user domain. Only users granted permission to that domain could view network topology and status information.

The invention also provides a means to measure and predict the growth of a datacenter by automating the creation and comparisons of inventory baselines using policy management. The user can configure the discovery manager to run periodic inventory reports facilitating data center planning.

What is claimed is:

1. A method of operating a storage management device, the method comprising:
    obtaining, at the storage management device, device information from a plurality of mass storage devices that are external to the storage management device;
    initializing and profiling the mass storage devices based on the device information; and
    communicating via a network between the storage management device and a plurality of host computers that are external to the storage management device, to enable the host computers to access data in the mass storage devices.

2. A method as recited in claim 1, wherein the device information includes at least one of: reliability information, availability information, a failover policy, command support capability, or performance information.

3. A method as recited in claim 1, wherein the device information includes reliability information, availability information, a failover policy, command support capability and performance information.

4. A method as recited in claim 1, further comprising:
    identifying a plurality of paths between the storage management device and the plurality of mass storage devices; and
    storing in the storage management device, information indicative of the plurality of paths.

5. A method as recited in claim 1, further comprising:
    detecting addition of a storage device to said plurality of mass storage devices.

6. A method as recited in claim 1, further comprising:
    receiving user-provided information relating to a configuration of virtual storage devices; and
    associating the mass storage devices with the virtual storage devices based on the device information.

7. A storage management device comprising:
    a plurality of first data ports through which the storage management device can communicate with a plurality of host computers that are external to the storage management device via a network;
    a plurality of second data ports through which the storage management device can communicate with a plurality of mass storage devices that are external to the storage management device;
    a switch fabric configured to selectively transfer data between pairs of data ports, each said pair including one of the first data ports and one of the second data ports;
    logic to cause the storage management device to obtain device information from the mass storage devices; and
    logic to cause the storage management device to initialize and profile the mass storage devices based on the device information.

8. A storage management device as recited in claim 7, further comprising:
    a plurality of storage processors to process storage commands and to control flow of data within the storage management device.

9. A storage management device as recited in claim 8, wherein each of the plurality of first data ports and each of the plurality of first data ports is associated with at least one of the plurality of storage processors.

10. A storage management device as recited in claim 7, further comprising:
    logic to detect addition of a mass storage device to plurality of mass storage devices.

11. A storage management device as recited in claim 7, wherein the device information includes at least one of: reliability information, availability information, a failover policy, command support capability or performance information.

12. A storage management device as recited in claim 7, wherein the device information includes reliability information, availability information, a failover policy, command support capability and performance information.

13. A storage management device as recited in claim 7, further comprising:
    logic to identify a plurality of paths between the storage management device and the plurality of mass storage devices; and
    logic to store in the storage management device, information indicative of the plurality of paths.

14. A storage management device as recited in claim 7, further comprising:
    logic to detect addition of a storage device to said plurality of mass storage devices.

15. A storage management device as recited in claim 7, further comprising:
    logic to receive user-provided information relating to a configuration of virtual storage devices; and
    logic to associate the mass storage devices with the virtual storage devices based on the device information.

16. A method of operating a storage management device, the method comprising:
    communicating via a network between the storage management device and a plurality of host computers that are external to the storage management device;
    communicating between the storage management device and a plurality of mass storage devices that are external to the storage management device; and in the storage management device, automatically detecting and characterizing changes in a topology of the plurality of mass storage devices.

17. A method as recited in claim 16, further comprising:
obtaining device information corresponding to the mass storage devices; and
characterizing and profiling the mass storage devices based on the device information.

18. A method as recited in claim 17, further comprising:
identifying a plurality of communication paths between the storage management device and the mass storage devices; and
generating information indicative of the communication paths.

19. A method as recited in claim 18, further comprising:
receiving user-provided information relating to a configuration of virtual storage devices; and
associating the mass storage devices to the virtual storage devices based on the device information and the information indicative of the communication paths.

20. A method as recited in claim 16, wherein the device information includes at least one of: reliability information, availability information, a failover policy, command support capability or performance information.

21. A storage management device comprising:
means for communicating via a network between the storage management device and a plurality of host computers that are external to the storage management device;
means for communicating between the storage management device and a plurality of mass storage devices that are external to the storage management device; and
means for automatically detecting and characterizing, in the storage management device, changes in a topology of the mass storage devices.

22. A method of operating a storage management device, the method comprising:
communicating via a network between the storage management device and a plurality of host computers that are external to the storage management device;
obtaining device information corresponding to a plurality of physical storage devices that are external to the storage management device;
identifying a plurality of communication paths between the storage management device and the physical storage devices;
generating path information indicative of the communication paths;
receiving user-provided information relating to a virtual storage configuration; and
associating the physical storage devices with the virtual storage configuration based on the device information, the user-provided information and the path information.

23. A method as recited in claim 22, wherein the device information includes at least one of: reliability information, availability information, a failover policy, command support capability or performance information.

24. A method as recited in claim 22, wherein the device information includes reliability information, availability information, a failover policy, command support capability and performance information.

25. A method as recited in claim 22, further comprising:
detecting changes in the communication paths; and
storing information indicative of the changes in the storage management device.

26. A method as recited in claim 22, further comprising:
receiving user-provided information relating to a configuration of virtual storage devices; and
associating the physical storage devices to the virtual storage devices based on the device information and the first communication paths.

27. A method as recited in claim 26, wherein each physical device can be associated with one or more of the virtual devices, wherein each virtual device can be associated with one or more of the physical devices.

* * * * *